Figure 1:
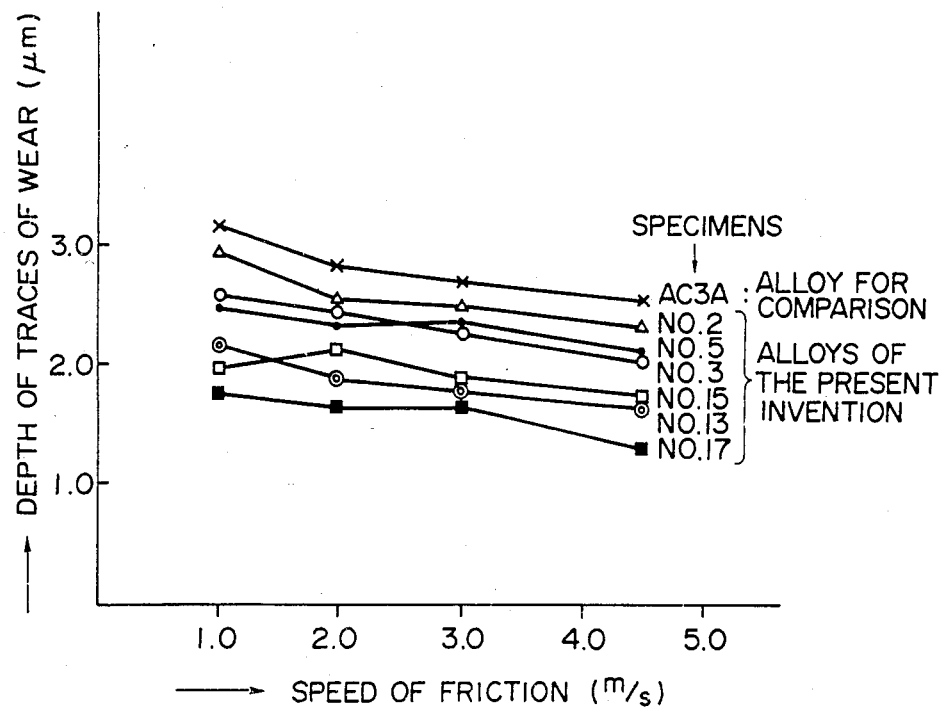

United States Patent [19]

Mori

[11] Patent Number: 4,732,820
[45] Date of Patent: Mar. 22, 1988

[54] ALUMINUM ALLOY SUITABLE FOR USE AS A MATERIAL FOR SLIDING PARTS

[75] Inventor: Sanae Mori, Nagoya, Japan

[73] Assignee: Daido Metal Company Ltd., Nagoya, Japan

[21] Appl. No.: 874,837

[22] Filed: Jun. 13, 1986

Related U.S. Application Data

[63] Continuation of Ser. No. 626,349, Jun. 29, 1984, abandoned.

[30] Foreign Application Priority Data

Apr. 27, 1984 [JP] Japan .................................. 59-85923

[51] Int. Cl.⁴ ............................................. B32B 15/01
[52] U.S. Cl. ..................................... 428/650; 420/530; 428/653
[58] Field of Search ............... 420/530; 428/650, 653; 148/438, 439

[56] References Cited

U.S. PATENT DOCUMENTS

4,471,033 9/1984 Fukuoka et al. .................... 428/653

Primary Examiner—R. Dean
Attorney, Agent, or Firm—Browdy and Neimark

[57] ABSTRACT

An Al alloy suitable for use as the material of a sliding part such as those in automotive internal combustion engine. The alloy consists essentially of: more than 11 weight % but up to 18 weight % of Si, more than 3 weight % but up to 10 weight % of Sn, not smaller than 0.2 weight % but less than 2 weight % of Cu, and the balance substantially Al. Pb may be added to improve the anti-seizure property and the compatibility. One, two or more elements selected from a group consisting of Na, Sr and P may be added to make fine the Si grains. The alloy can further contain also at least one element selected from the group consisting of Mn, V, Cr, Ti, Mg and Fe in order to further improve the mechanical properties, particularly the strength. This alloy exhibits superior anti-seizure property and high wear resistance and, hence, can be used suitably as the material of various sliding parts.

24 Claims, 7 Drawing Figures

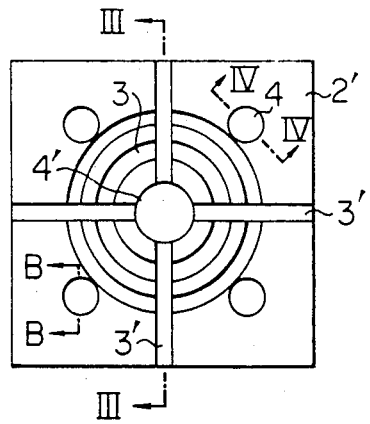
FIG. 2
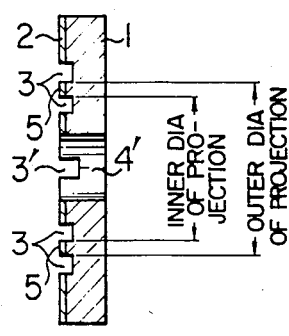 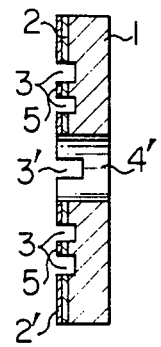 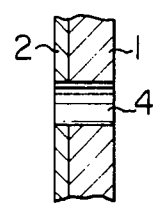 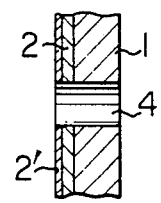
FIG. 3A  FIG. 3B  FIG. 4A  FIG. 4B
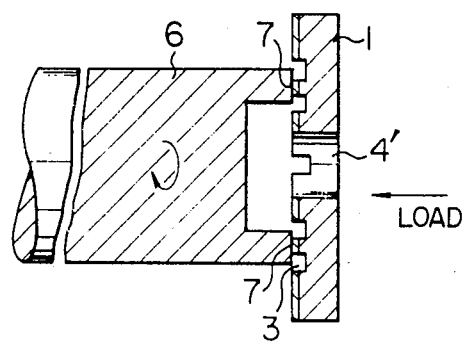
FIG. 5

ALUMINUM ALLOY SUITABLE FOR USE AS A MATERIAL FOR SLIDING PARTS

This application is a continuation, of application Ser. No. 626,349, filed June 29, 1984 abandoned.

The present invention relates to an aluminum alloy for use as the material of a sliding part, having superior wear-resistance, load bearing, and anti-seizure characteristics, as well as high machinability.

Al—Si system alloys, referred to as "silmin-system alloy", e.g., aluminum alloy casting material JIS AC3A, have a superior castability, as well as a small coefficient of thermal expansion, but suffer from disadvantages such as inferior wear resistance, machinability and durability.

In recent years, there has been a remarkable degree of progress and innovation in various fields of technology. In the field of the automotive internal combustion engine, for instance, the level of power, as well as overall performance, is rising with the result that the higher speed, load and temperature are apt to be applied to the sliding Al alloy. This in turn gives rise to the demand for alloys to have a higher resistance to wear. However, the known aluminum alloy generally exhibits inferior anti-seizure characteristics, thus increasing the tendency of the sliding part to cause seizure.

Accordingly, it is a primary object of the invention to provide an aluminum based alloy suitable for use as the material of a sliding part, wherein Cu is added to an Al—Si alloy to strengthen the matrix; and Sn, which has an excellent anti-seizure property and good compatibility, is added by such an amount that does not cause a substantial reduction of the load carrying capacity of the alloy.

The alloy of the invention can include various additional components to meet various purposes or uses. For instance, Pb may be added to further improve the anti-seizure property and compatibility. It is also possible to make the Si grain finer so as to improve the mechanical properties, by adding one, two or more of Na, Sr and P, or it is possible to improve the mechanical properties, particularly strength, by adding at least one selected from the group consisting of Mn, V, Cr, Ti, Mg and Fe. The elements mentioned above may be selectively used to produce multiplied effect or advantage of these elements to provide a sliding alloy of the invention which exhibits superior wear resistance, load carrying capacity, anti-seizure property and machinability.

The aluminum alloy of the invention may be used in the form of aluminum alloy castings as cast or may be used in the form of a solid material after plastic working such as extrusion, rolling and/or forging. It is also possible to use the alloy of the invention in the form of a bimetal, by pressure-bonding a sheet of this alloy to a back metal which may be a steel.

According to one form of the invention, there is provided an Al system alloy suitable for use as the material of a sliding part, consisting essentially of: more than 11 weight % to 18 weight % of Si, more than 3 weight % to 10 weight % of Sn, not smaller than 0.2 weight % but less than 2 weight % of Cu, and the balance substantially Al. Preferably, Si content is 11.5 to 13.5 weight %, Sn content being more than 3 weight % but up to 6 weight % and Cu content being 0.5–1.5 weight %.

According to another form of the invention, there is provided an Al system alloy suitable for use as the material of a sliding part, consisting essentially of: more than 11 weight % to 18 weight % of Si, more than 3 weight % to 10 weight % of Sn, not less than 0.2 weight % but less than 2 weight % of Cu, not less than 0.2 weight % but less than 2 weight % of Pb and the balance substantially Al. Preferably, Pb content is 1–1.5 weight %.

According to still another form of the invention, there is provided an Al system alloy suitable for use as the material of a sliding part, consisting essentially of: more than 11 weight % to 18 weight % of Si, more than 3 weight % to 10 weight % of Sn, not smaller than 0.2 weight % but less than 2 weight % of Cu, not less than 0.005 weight % but not more than 0.5 weight % of at least one selected from a group consisting of Na, Sr and P and the balance substantially Al. Preferably, at least one of Na, Sr and P is 0.01–0.05 weight % in content.

According to a further form of the invention, there is provided an Al system alloy suitable for use as the material of a sliding part, consisting essentially of: more than 11 weight % to 18 weight % of Si, more than 3 weight % to 10 weight % of Sn, not smaller than 0.2 weight % but less than 2 weight % of Cu, not less than 0.01 weight % but not greater than 5 weight % of at least one selected from the group consisting of Mn, V, Cr, Ti, Mg and Fe and the balance substantially Al.

According to a still further form of the invention, there is provided an Al system alloy suitable for use as the material of a sliding part, consisting essentially of: more than 11 weight % to 18 weight % of Si, more than 3 weight % to 10 weight % of Sn, not smaller than 0.2 weight % but less than 2 weight % of Cu, not less than 0.2 weight % but less than 2 weight % of Pb, not less than 0.005 weight % but not greater than 0.5 weight % of at least one selected from a group consisting of Na, Sr and P and the balance substantially Al.

According to a still further form of the invention, there is provided an Al system alloy suitable for use as the material of a sliding part, consisting essentially of: more than 11 weight % to 18 weight % of Si, more than 3 weight % to 10 weight % of Sn, not smaller than 0.2 weight % but less than 2 weight % of Cu, not less than 0.2 weight % but less than 2 weight % of Pb, not less than 0.01 weight % but not greater than 5 weight % of at least one selected from a group consisting of Mn, V, Cr, Ti, Mg and Fe and the balance substantially Al.

According to a still further form of the invention, there is provided an Al system alloy suitable for use as the material of a sliding part, consisting essentially of: more than 11 weight % to 18 weight % of Si, more than 3 weight % to 10 weight % of Sn, not smaller than 0.2 weight % but less than 2 weight % of Cu, not less than 0.005 weight % but not greater than 0.5 weight % of at least one selected from the group consisting of Na, Sr and P, not less than 0.01 weight % but not greater than 5 weight % of at least one selected from the group consisting of Mn, V, Cr, Ti, Mg and Fe and the balance substantially Al.

According to a still further form of the invention, there is provided an Al system alloy suitable for use as the material of a sliding part, consisting essentially of: more than 11 weight % to 18 weight % of Si, more than 3 weight % to 10 weight % of Sn, not smaller than 0.2 weight % but less than 2 weight % of Cu, not less than 0.2 weight % but less than 2 weight % of Pb, not less than 0.005 weight % but not greater than 0.5 weight % of at least one selected from the group consisting of Na, Sr and P, not less than 0.01 weight % but not greater than 5 weight % of at least one selected from the group consisting of Mn, V, Cr, Ti, Mg and Fe and the balance substantially Al.

An explanation will be made hereinunder as to the reason for limiting the contents of the respective component of the aluminum alloy of the invention suitable for use as a material for sliding parts.

(1) Si: Si offers, when its content ranges exceeding 11 weight % but upto 18 weight %, various advantages such as a superior anti-creep property, prevention of plastic flow while maintaining good anti-cohesion property, increase in wear resistance and load capacity, and improvement in anti-seizure characteristics. These effects do not become appreciable when the Si content is below 11 weight %, while Si content exceeding 18 weight % undesirably impairs the castability, as well as the plastic workability and machinability of the alloy. Preferably, the content of Si is 11.5-13.5 weight %.

(2) Sn: Sn provides, when its content ranges exceeding 3 weight % but upto 10 weight %, a good self-lubricating property. When the Sn content falls within the above-mentioned range, the Sn is uniformly distributed along the grain boundary of aluminum to provide good slidability and compatibility of the alloy, thereby attaining superior anti-seizure property and machinability. These effects produced by the addition of Sn, however, are not appreciable when the Sn content comes down below 3 weight %, while an Sn content exceeding 10 weight % undesirably reduces the strength thus decreasing the load carrying capacity. Preferably, the content of Sn is more than 3 weight % but upto 6 weight %.

(3) Cu: Cu is contained, when its content ranges not less than 0.2 weight % but less than 2 weight %, in the form of a uniform solid solution in the matrix to improve the mechanical strength, as well as the wear resistance. When Cu content is less than 0.2 weight %, it is not possible to obtain sufficient mechanical properties, whereas any Cu content not less than 2 weight % impairs the castability and workability. Preferably, the content of Cu is 0.5-1.5 weight %.

(4) Pb: When Pb is added, its content should be selected to fall within the range of not less than 0.2 weight % but less than 2 weight %, in order to improve the anti-seizure property, compatibility to oil and machinability. The effect of addition of Pb is not remarkable when Pb content is less than 0.2 weight %. On the other hand, a Pb content not smaller than 2 weight % makes the uniform dispersion unobtainable. Preferably, the content of Pb is 1 to 1.5 weight %.

(5) Na, Sr, P: The alloy of the invention can contain at least one of Na, Sr and P by an amount not smaller than 0.005 weight % but not greater than 0.5 weight %.

These elements are effective in making fine the grains of Si in the alluminum alloy and, hence, improve the mechanical properties, especially elongation. More specifically, Na and Sr are effective in the fining of eutectic Si grains, while P is effective mainly for the fining of primary crystal grains of Si. The fining effect is not so remarkable when the content of these elements is below 0.005 weight %, and the castability will be impaired when the content exceeds 0.5 weight %. Preferably, the content of such at least one is 0.01-0.05 %.

(6) The alloy of the invention can contain not smaller than 0.01 weight % but not greater than 5 weight % of at least one of Mn, V, Cr, Ti, Mg and Fe. These elements improve the mechanical properties, particularly the strength, of the aluminum alloy, and cooperate with the essential elements of the alloy of the invention to improve the wear resistance, load carrying capacity and anti-seizure property. When the content of one or more of these elements is below 0.01 weight %, the above-stated effects are not appreciable. On the other hand, the alloy itself becomes brittle thus reducing the plastic workability when the content exceeds 5 weight %.

The optimum content of the additional element or elements which are used selectively is determined in the light of the effect of multiplication of advantage through cooperation of at least one of such additional elements and the essential elements of the alloy of the invention. The best result was observed when the content of the additional element or elements ranges between 0.01 weight % and 5 weight %.

The above and other objects, features and advantages of the invention will become clear from the following description of the preferred embodiments taken in conjunction with the accompanying drawing.

FIG. 1 is a graph showing the relationship between the friction speed and the depth of wear observed in the alloy of the invention, together with that in comparison alloys;

FIG. 2 being a front view of a test piece used in anti-seizure test;

FIGS. 3A and 3B being a sectional view taken along line III—III in FIG. 2;

FIGS. 4A and 4B being a sectional view taken along lines IV—IV in FIG. 2;

FIG. 5 shows a sectional view of the test piece and a shaft in pressure contact therewith during the anti-seizure test.

Alloys of compositions as shown in Table 1, each in the amount of 200-300 kg, were melted at a temperature in the range of 680°-730° C. by use of a gas furnace. Then, the molten Al alloy was continuously cast into billets 25.4 mm in thickness and 200 to 270 mm in width. After the continuous casting of the Al alloy into the billets, the billets were extruded at a temperature of 350°-400° C. with an extrusion ratio of 20:1 to 50:1 (or, a reduction of area of 5/100 to 2/100) at a speed of 0.2-1 mm/sec. The extruded material was then rolled to prepare band sheets. The alloy sheets were then superposed to steel sheets having thickness of 2-5 mm which serve as back metals, and were pressure bonded thereto with reduction ratio of 0.3-0.5 by means of a roll to form bimetals. The bimetals were then processed into test pieces each having a width of 20 mm, a height of 50 mm and a thickness of 3 mm for wear test and other test pieces for seizure test the size of which test piece is shown in Table 4. The result of the wear test on some representative samples are shown in the drawing, while the results of the anti-seizure test are shown in Table 2. The conditions of the wear test and anti-seizure test are shown in Tables 3 and 4, respectively. The shape of an anti-seizure test piece and the state of the anti-seizure test are respectively shown in FIGS. 2 to 4B and FIG. 5, wherein Al alloy layer 2 is produced on the steel backing layer 1, each side of the test piece having a length of 50 mm. Two annular coaxial groves 3 are formed on one surface of the test piece so as to define an annular projection having an outward surface (5) with which an annular end 7 of a rotating shaft 6 is adapted to be in pressure contact for the purpose of evaluating the anti-seizure characteristic of the Al alloy as shown in FIG. 5.

Two straight grooves 3' being formed on the same surface thereof which grooves 3' cross each other vertically, a relatively large size through hole 4' and relatively small size through holes 4 being formed to attach the test piece to a seizure testing machine. FIGS. 3B and 3A show an over-lay 2' (Pb of 90% and Sn of 10% alloy) applied on the surface of Al alloy layer in the test piece.

An analysis of the result of the wear test proves that the alloy of sample No. 2, which is obtained by adding 6 weight % of Sn and 1 weight % of Cu to the comparison alloy AC3A, exhibits a smaller depth of wear than the comparison alloy AC3A, regardless of the friction speed. The alloy of sample No. 3, which is obtained by adding 6 weight % of Sn, 1 weight % of Cu, 0.3 weight % of V, 0.1 weight % of Ti and 0.1 weight % of Sr, exhibits a further reduced wear depth as compared with the reference alloy AC3A. This remarkable effect is attributable to a strengthening of the matrix by the addition of Cu and, in the case of the alloy of sample No. 3, also to the multiplied effect produced by the addition of V, Ti and Sr.

Referring to Table 2 showing the test result, seizure was observed with two comparison alloys at a comparatively low load level of 176.9 Kg/cm$^2$ and, at higher load levels of 206.4 Kg/cm$^2$ and 235.8 Kg/cm2, each of the comparison alloy test pieces caused seizure. In contrast, in the case of the alloy of sample No. 2 which was obtained by adding 6 weight % of Sn and 1 weight % of Cu to the comparison alloy and the case of the alloy of the sample No. 3 which contains V, Ti and Sr, the seizure starts to occur at a higher load levels, 265.3 Kg/cm$^2$. One test piece of each of the alloys of sample Nos. 2 and 3 did not experience seizure even at the highest load level of 294.8 Kg/cm$^2$.

The alloy of sample No. 5 was obtained by adding 1.5 weight % of Pb to the alloy of sample No. 3. Referring to the sole Figure showing the result of the wear test, no notable difference in wear depth exists between the alloys of sample Nos. 3 and 5, although the alloy of sample No. 5 containing Pb exhibits a somewhat greater wear depth at friction speeds of 3.1 m/sec and 4.6 m/sec. As to the anti-seizure property, as shown in Table 2 showing the result of the seizure test, two test pieces of the alloy of sample No. 5 did not cause seizure even at the highest load level, while one test piece in the alloy of the sample No. 3 did not cause seizure. From this fact, it is understood that the alloy of sample No. 5 containing Pb has somewhat better anti-seizure property than that of the alloy of the sample No. 3 containing no Pb.

Attention must be drawn here to the fact that, in a case where an overlay (90 weight % Pb and 10 weight % Sn) is provided on the surface of the alloy of the sample No. 5, all of the sample No. (5) did not shown any seizure even at the highest level of the load.

The alloy of sample No. 13 contains 14 weight % of Si, 9 weight % of Sn, 0.5 weight % of Pb, 1.5 weight % of Cu, 0.5 weight % of Mn, 0.5 weight % of Cr, 0.3 weight % of Mg, 0.5 weight % of Fe, 0.1 weight % of P and 0.05 weight % of Sr. As will be seen from the attached Figure, this alloy has a higher wear resistance than the comparison alloy. This alloy exhibits also a superior anti-seizure property. Namely, as shown in Table 2, the seizure starts to occur at a high load level of 265.3 Kg/cm$^2$, and one test piece of this alloy did not cause seizure even at the highest level of the load. Thus, this alloy is superior to the comparison alloy also in terms of the anti-seizure property.

The alloy of sample No. (13) appearing in Table 2 was obtained by providing an overlay (90 weight % Pb, 10 weight % Sn) on the surface of the alloy of sample No. 13. None of the test pieces of this alloy sample No. (13) showed seizure even at the highest level of the load.

The alloy of sample No. 15 was obtained by increasing the Si content of the comparison alloy AC3A to 17 weight % and adding thereto 6 weight % of Sn and 1 weight % of Cu. As will be seen from the sole Figure showing the result of the wear test, this alloy exhibits less wear depth and increased wear resistance because of the presence of finely divided primary crystal grain of Si, as compared with the alloy of the sample No. 2 containing 6 weight % of Sn and 1 weight % of Cu. As to the anti-seizure property, while all of the test pieces of the comparison alloy caused seizure within the range between 176.9 Kg/cm$^2$ and 235.8 Kg/cm$^2$, in the case of the present invention only one of the test pieces of the alloy of the sample No. 15 caused for the first time seizure at higher load level of 265.3 Kg/cm$^2$. This alloy thus has sufficiently high anti-seizure property which is slightly inferior to that of the alloy of sample No. 2, although three test pieces were seized at the highest load level of 294.8 Kg/cm$^2$.

The alloy of sample No. 17 was prepared by adding the following elements to the alloy of the sample No. 15:1.5 weight % of Pb, 1 weight % of Mn, 1 weight % of Mg, 0.05 weight % of V, 0.1 weight % of Ti, 0.05 weight % of P and 0.1 weight % of Sr. As will be seen from the Figure showing the result of the wear test, this alloy showed only a small wear depth which is about one half that of the comparison alloy at any friction speed, thus proving a remarkably improved wear resistance. An analysis of the seizure test result shown in Table 2 proved that this alloy of sample No. 17 has an anti-seizure property superior to that of the comparison alloy, in that two test pieces were seized at each of the load levels of 235.8 Kg/cm$^2$ and 265.3 Kg/cm$^2$.

These favourable effects are attributable to the multiplication of the effects brought about by the cooperation of the essential elements of the alloy of the invention and the additional elements added to the alloy. The fact that the alloy of the invention exhibits higher wear resistance and an anti-seizure property means that the load carrying capacity and the machinability are also superior, which well satisfies the object of the invention stated before.

TABLE 1

| Kind of alloy | Sample No. | Chemical Composition (weight %) | | | | | | | | | | | | |
|---|---|---|---|---|---|---|---|---|---|---|---|---|---|---|
| | | Al | Si | Sn | Cu | Pb | Mn | V | Cr | Ti | Mg | Fe | P | Sr | Na |
| Comparison alloy | AC3A | Bal | 12 | | | | | | | | | | | | |
| Alloys of invention | 1 | " | 12 | 3.5 | 0.5 | | | 1 | | 0.3 | | 1.5 | | | |
| | 2 | " | 12 | 6 | 1 | | | | | | | | | | |
| | 3 | " | 12 | 6 | 1 | | | 0.3 | | 0.1 | | | | 0.1 | |
| | 4 | " | 12 | 6 | 1 | 1.5 | | | | | | | | | |
| | 5 | " | 12 | 6 | 1 | 1.5 | | 0.3 | | 0.1 | | | | 0.1 | |

TABLE 1-continued

| Kind of alloy | Sample No. | Al | Si | Sn | Cu | Pb | Mn | V | Cr | Ti | Mg | Fe | P | Sr | Na |
|---|---|---|---|---|---|---|---|---|---|---|---|---|---|---|---|
| | 6 | " | 12 | 6 | 1.5 | | | | | | | | | 0.3 | |
| | 7 | " | 12 | 10 | 0.5 | 0.5 | | | | | | | | | 0.1 |
| | 8 | " | 14 | 3.5 | 1 | | 2 | | | 0.3 | 1.5 | | 0.1 | 0.05 | |
| | 9 | " | 14 | 3.5 | 1.5 | 1 | | | | | 1 | | | | |
| | 10 | " | 14 | 6 | 1 | 1.5 | | 0.5 | | 0.1 | | 2 | | | |
| | 11 | " | 14 | 6 | 1.5 | | | | 0.5 | | | | | | |
| | 12 | " | 14 | 9 | 1 | 1 | | | | | | | 0.05 | 0.2 | |
| | 13 | " | 14 | 9 | 1.5 | 0.5 | 0.5 | | 0.5 | | 0.3 | 0.5 | 0.1 | 0.05 | |
| | 14 | " | 17 | 3.5 | 1 | | | | | | | | 0.1 | 0.3 | |
| | 15 | " | 17 | 6 | 1 | | | | | | | | | | |
| | 16 | " | 17 | 6 | 1 | | | 0.3 | | 0.1 | | | | | |
| | 17 | " | 17 | 6 | 1 | 1.5 | 1 | 0.05 | | 0.1 | 1 | | 0.05 | 0.1 | |

TABLE 2

| Kind of alloy | Sample No. | Result of Seizure Test Surface pressure (kg/cm²) | | | | | | | |
|---|---|---|---|---|---|---|---|---|---|
| | | 117.9 | 147.4 | 176.9 | 206.4 | 235.8 | 265.3 | 294.8 | No seizure |
| Comparison alloy | AC3A | | xx | x | x | | | | |
| Alloy of invention | 1 | | | | x | x | xx | | |
| | 2 | | | | | | x | xx | o |
| | 3 | | | | | | xx | x | o |
| | 4 | | | | | | | xx | oo |
| | 5 | | | | | | x | x | oo |
| | (5) | | | | | | | | oooo |
| | 6 | | | | | | x | xx | o |
| | 7 | | | | | | | x | ·ooo |
| | 8 | | | | | x | xx | x | |
| | 9 | | | | | | x | xxx | |
| | 10 | | | | | | x | xx | o |
| | 11 | | | | | | x | xxx | |
| | 12 | | | | | | x | x | oo |
| | 13 | | | | | | xx | x | o |
| | (13) | | | | | | | | oooo |
| | 14 | | | | | xx | x | x | |
| | 15 | | | | | | x | xxx | |
| | 16 | | | x | xx | x | | | |
| | 17 | | | | | xx | xx | | |

(Note)
Sample Nos. (5) and (13) are composite materials obtained by forming overlay plating layers on the alloys of sample Nos. 5 and 13, respectively.

TABLE 3

| Conditions of Wear Test | |
|---|---|
| Final load | 20.7 kg |
| Friction speed | 1.0, 2.1, 3.1, 4.6 m/s |
| Friction distance | 200 m |
| Lubricating oil | SAE #30 |
| Amount of lubricating oil | 20 ± 2 drips/min |

TABLE 4

| Conditions of Seizure Test | | |
|---|---|---|
| Testing condition | Size | Unit |
| Outer diameter and inner diameter of projection in test pieces | 27.2 × 22 | mm |
| Revolution speed of shift | 1500 | rpm |
| Peripheral speed of the end of shaft | 1.93 | m/s |
| Lubrication oil | SAE #30 | — |
| Lubricating method | Oil bath | — |
| Lubricating temperature | Room temperature | °C. at the start |
| Shaft material | S45C | — |
| Shaft surface roughness | 0.3 | Rmax μm |
| Shaft hardness | 500–600 | Hv 10 kg |
| Load | Maximum surface pressure 294.8 kg/cm² | |

TABLE 4-continued

Conditions of Seizure Test
(tested under static load)

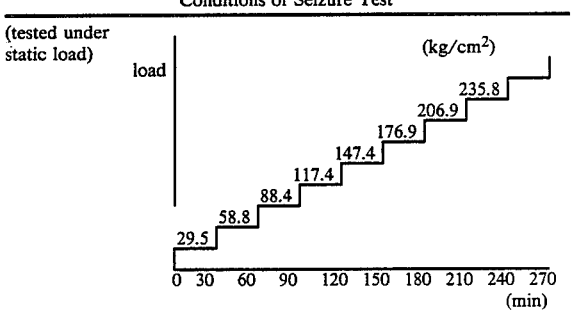

(Note) Load was measured when the test piece surface temperature has exceeded 200° C. or when the friction force has reached 50 kg · cm.

What is claimed is:

1. An Al alloy suitable for use as the material of a sliding part, consisting essentially of: 11.5 weight percent to 18 weight % of Si, more than 3 weight % but up to 10 weight % of Sn, not smaller than 0.2 weight but less than 2 weight % of Cu, and the balance substantially Al.

2. An Al alloy as claimed in claim 1, further containing not less than 0.2 weight % but less than 2 weight % of Pb.

3. An Al alloy as claimed in claim 1 wherein said Si is of fine grain size, and containing not less than 0.005 weight % but not more than 0.5 weight % of at least one selected from a group consisting of Na, Sr and P.

4. An Al alloy as claimed in claim 1, further containing not less than 0.01 weight % but not greater than 5 weight % of at least one selected from the group consisting of Mn, V, Cr, Ti, Mg and Fe.

5. An Al alloy as claimed in claim 2 wherein said Si is of fine grain size, and containing not less than 0.005 weight % but not greater than 0.5 weight % of at least one selected from a group consisting of Na, Sr and P.

6. An Al alloy as claimed in claim 2, further containing not less than 0.01 weight % but not greater than 5 weight % of at least one selected from a group consisting of Mn, V, Cr, Ti, Mg and Fe.

7. An Al alloy as claimed in claim 3, further containing not less than 0.01 weight % but not greater than 5 weight % of at least one selected from the group consisting of Mn, V, Cr, Ti, Mg and Fe.

8. An Al alloy as claimed in claim 5, further containing not less than 0.01 weight % but not greater than 5 weight % of at least one selected from the group consisting of Mn, V, Cr, Ti, Mg and Fe.

9. An Al alloy suitable for use as the material of a sliding part according to claim 1, wherein said Al alloy is lined with a back metal.

10. An Al alloy suitable for use as the material of a sliding part according to claim 2, wherein said Al alloy is lined with a back metal.

11. An Al alloy suitable for use as the material of a sliding part according to claim 3, wherein said Al alloy is lined with a back metal.

12. An Al alloy suitable for use as the material of a sliding part according to claim 4, wherein said Al alloy is lined with a back metal.

13. An Al alloy suitable for use as the material of a sliding part according to claim 5, wherein said Al alloy is lined with a back metal.

14. An Al alloy suitable for use as the material of a sliding part according to claim 6, wherein said Al alloy is lined with a back metal.

15. An Al alloy suitable for use as the material of a sliding part according to claim 7, wherein said Al alloy is lined with a back metal.

16. An Al alloy sliding part according to claim 8, wherein said Al alloy is lined with a back metal.

17. An Al alloy sliding part according to claim 1, wherein said Al alloy is coated with an over-lay plating layer.

18. An Al alloy suitable for use as the material of a sliding part according to claim 2, wherein said Al alloy is coated with an over-lay plating layer.

19. An Al alloy suitable for use as the material of a sliding part according to claim 3, wherein said Al alloy is coated with an over-lay plating layer.

20. An Al alloy suitable for use as the material of a sliding part according to claim 4, wherein said Al alloy is coated with an over-lay plating layer.

21. An Al alloy suitable for use as the material of a sliding part according to claim 5, wherein said Al alloy is coated with an over-lay plating layer.

22. An Al alloy suitable for use as the material of a sliding part according to claim 6, wherein said Al alloy is coated with an over-lay plating layer.

23. An Al alloy suitable for use as the material of a sliding part according to claim 7, wherein said Al alloy is coated with an over-lay plating layer.

24. An Al alloy suitable for use as the material of a sliding part according to claim 8, wherein said Al alloy is coated with an over-lay plating layer.

* * * * *